US010697683B2

(12) United States Patent
Sun et al.

(10) Patent No.: US 10,697,683 B2
(45) Date of Patent: Jun. 30, 2020

(54) REFRIGERATION SYSTEM CONDENSER FAN CONTROL

(71) Applicant: Carrier Corporation, Farmington, CT (US)

(72) Inventors: Jian Sun, Syracuse, NY (US); Linhui Chen, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 107 days.

(21) Appl. No.: 15/553,380

(22) PCT Filed: Feb. 26, 2016

(86) PCT No.: PCT/US2016/019775
§ 371 (c)(1),
(2) Date: Aug. 24, 2017

(87) PCT Pub. No.: WO2016/138382
PCT Pub. Date: Sep. 1, 2016

(65) Prior Publication Data
US 2018/0073791 A1 Mar. 15, 2018

(30) Foreign Application Priority Data

Feb. 27, 2015 (CN) .......................... 2015 1 0089508

(51) Int. Cl.
F25B 49/02 (2006.01)
F25B 40/02 (2006.01)
(Continued)

(52) U.S. Cl.
CPC ............ *F25B 49/027* (2013.01); *F25B 27/00* (2013.01); *F25B 40/00* (2013.01); *F25B 40/02* (2013.01);
(Continued)

(58) Field of Classification Search
CPC ............. F25B 49/027; F25B 2600/111; F25B 2700/21176; F25B 39/04
See application file for complete search history.

(56) References Cited

U.S. PATENT DOCUMENTS 5,907,957 A   6/1999  Lee et al.
6,560,980 B2  5/2003  Gustafson et al.
(Continued)

FOREIGN PATENT DOCUMENTS

CN   103016382 A    4/2013
RU      2230265 C2  6/2004
(Continued)

OTHER PUBLICATIONS

International Search Report and Written Opinion for application PCT/US2016/019775, dated Jul. 18, 2016, 16pgs.
(Continued)

*Primary Examiner* — Elizabeth J Martin
(74) *Attorney, Agent, or Firm* — Cantor Colburn LLP

(57) ABSTRACT

A method of controlling a refrigeration system having a compressor, a condenser, an evaporator, and a variable speed condenser fan is provided. The method includes determining if a change in an ambient temperature or a compressor suction pressure is greater than a predetermined threshold, determining a near-optimal condensing pressure/temperature if the change in the ambient temperature or the compressor suction pressure is above the predetermined threshold, setting a condensing pressure setpoint based on the determined near-optimal condensing pressure/temperature, and setting a speed of the variable speed condenser fan based on the condensing pressure setpoint.

14 Claims, 3 Drawing Sheets

(51) Int. Cl.
*F25B 47/02* (2006.01)
*F25B 27/00* (2006.01)
*F25B 40/00* (2006.01)
*F25B 41/04* (2006.01)
*F25D 11/00* (2006.01)

(52) U.S. Cl.
CPC .......... *F25B 41/043* (2013.01); *F25B 47/022* (2013.01); *F25B 2327/001* (2013.01); *F25B 2500/19* (2013.01); *F25B 2600/111* (2013.01); *F25B 2600/17* (2013.01); *F25B 2700/15* (2013.01); *F25B 2700/171* (2013.01); *F25B 2700/1933* (2013.01); *F25B 2700/2106* (2013.01); *F25B 2700/21175* (2013.01); *F25D 11/003* (2013.01); *Y02B 30/743* (2013.01)

(56) References Cited

U.S. PATENT DOCUMENTS

| | | | |
|---|---|---|---|
| 6,910,341 B2 | 6/2005 | Srichai et al. | |
| 7,743,617 B2 | 6/2010 | Crane et al. | |
| 7,878,014 B2 | 2/2011 | Akehurst et al. | |
| 7,963,117 B2 | 6/2011 | Allen et al. | |
| 8,051,668 B2 | 11/2011 | Singh et al. | |
| 8,484,990 B2 | 7/2013 | Ballet et al. | |
| 8,825,184 B2 | 9/2014 | Burns | |
| 2006/0112703 A1* | 6/2006 | Singh | F25B 49/027 62/183 |
| 2012/0111044 A1 | 5/2012 | Chen et al. | |
| 2012/0137713 A1 | 6/2012 | Duraisamy et al. | |
| 2013/0139529 A1* | 6/2013 | Lu | F25D 17/06 62/89 |
| 2014/0096547 A1* | 4/2014 | Boehde | F04D 27/004 62/89 |
| 2014/0140810 A1 | 5/2014 | Balistreri et al. | |
| 2014/0223934 A1 | 8/2014 | Zolli et al. | |
| 2014/0236361 A1 | 8/2014 | Noll et al. | |
| 2014/0326002 A1 | 11/2014 | Sunderland et al. | |
| 2016/0131405 A1* | 5/2016 | Burns | F25B 49/027 62/117 |

FOREIGN PATENT DOCUMENTS

| | | |
|---|---|---|
| RU | 2010152246 A | 6/2012 |
| WO | 201406063 A1 | 7/2014 |

OTHER PUBLICATIONS

Russian Office Action for application 2017129752, dated Jul. 23, 2019, 6 pages.

* cited by examiner

REFRIGERATION SYSTEM CONDENSER FAN CONTROL

FIELD OF THE INVENTION

The subject matter disclosed herein relates to refrigeration systems and, more specifically, to condenser fan control optimization for transportation refrigeration systems.

BACKGROUND

Temperature controlled cargo containers, such as refrigerated trailers, are commonly used to transport food products and other temperature sensitive products. A refrigerated trailer typically includes a refrigeration unit generally mounted on the front wall of the trailer with a portion protruding into the interior of the trailer. In some known trailers, a fuel-burning engine may be used to drive a compressor of the refrigeration system.

Fuel usage and fuel efficiency is critical in the evaluation of transportation refrigeration systems. To reduce the fuel usage or improve fuel efficiency, particularly at part load conditions, some transportations refrigeration systems have moved from single speed technology to Variable Frequency Drive (VFD) or Multi-Speed Drive (MSD) technologies. Proper control of the VFD's and MSD's is required in order to achieve measurable improvement.

BRIEF DESCRIPTION OF THE INVENTION

In one aspect, a method of controlling a refrigeration system having a compressor, a condenser, an evaporator, and a variable speed condenser fan is provided. The method includes determining if a change in an ambient temperature or a compressor suction pressure is greater than a predetermined threshold, determining a near-optimal condensing pressure/temperature if the change in the ambient temperature or the compressor suction pressure is above the predetermined threshold, setting a condensing pressure setpoint based on the determined near-optimal condensing pressure/temperature, and setting a speed of the variable speed condenser fan based on the condensing pressure setpoint.

In addition to one or more of the features described above, or as an alternative, further embodiments may include: wherein the step of determining the near-optimal condensing pressure/temperature comprises determining an ambient temperature, determining a saturation temperature leaving the evaporator, determining a compressor speed, and determining the near-optimal condensing pressure/temperature based on the determined ambient temperature, saturation temperature leaving the evaporator, and compressor speed; wherein the near-optimal condensing pressure/temperature is determined using the equation (1) described herein; determining a first total power consumption of the refrigeration system and setting as a current minimal power (Wmin), reducing a speed of the variable speed condenser fan by a predetermined amount, subsequently determining a second total power consumption of the refrigeration system and setting as a current power (Wcur), and determining if Wcur is greater than Wmin; increasing the speed of the variable speed condenser fan by a predetermined amount if Wcur is greater than Wmin; and/or subsequently determining a third total power consumption of the refrigeration system and setting as current power (Wcur), and determining if Wcur is greater than Wmin.

In another aspect, a method of controlling a refrigeration system having a compressor, a condenser, an evaporator, and a multi-speed condenser fan is provided. The method includes determining if a change in the ambient temperature or a suction pressure is greater than a predetermined threshold, determining a condensing pressure (Pcd) if the change in the ambient temperature or the suction pressure is greater than the predetermined threshold, determining an upper bound condensing pressure (Pcd_upbound), determining a lower bound condensing pressure (Pcd_lowbound), and setting a speed of the multi-speed condenser fan based on the determined condensing pressure Pcd and at least one of the upper bound condensing pressure Pcd_upbound and the lower bound condensing pressure Pcd_lowbound.

In addition to one or more of the features described above, or as an alternative, further embodiments may include: wherein determining a condensing pressure Pcd comprises using an optimum pressure table defining optimum pressures at different conditions, wherein the conditions are functions of ambient temperature, evaporator outlet saturation temperature/pressure, and compressor speed; wherein determining an upper bound condensing pressure Pcd_upbound comprises using an optimum pressure table defining optimum pressures at different conditions, wherein the conditions include ambient temperature, evaporator outlet saturation temperature or box temperature, vehicle run/stop status, and compressor speed; wherein determining a lower bound condensing pressure Pcd_lowbound comprises using an optimum pressure table defining optimum pressures at different conditions, wherein the conditions include ambient temperature, evaporator exit temperature or box temperature, vehicle run/stop status, and compressor speed; determining whether Pcd is greater than Pcd_upbound; operating the multi-speed condenser fan in a high speed mode if Pcd is greater than Pcd_upbound; determining whether Pcd is greater than Pcd_lowbound; operating the multi-speed condenser fan in a low speed mode if Pcd is greater than Pcd_lowbound; and/or turning off the multi-speed condenser fan if Pcd is less than or equal to Pcd_lowbound.

In yet another aspect, a method of controlling a refrigeration system having a compressor, a condenser, an evaporator, a variable speed condenser fan, and a multi-speed condenser fan is provided. The method includes determining if a change in an ambient temperature or a compressor suction pressure is greater than a predetermined threshold, controlling a speed of the variable speed condenser fan, and controlling a speed of the multi-speed condenser fan. Controlling the speed of the variable speed condenser fan includes determining a near-optimal condensing pressure/temperature if the change in the ambient temperature or the compressor suction pressure is above the predetermined threshold, setting a condensing pressure setpoint based on the determined near-optimal condensing pressure/temperature, and setting a speed of the variable speed condenser fan based on the condensing pressure setpoint. Controlling a speed of the multi-speed condenser fan includes determining a condensing pressure (Pcd) if the change in the ambient temperature or the suction pressure is greater than the predetermined threshold, determining an upper bound condensing pressure (Pcd_upbound), determining a lower bound condensing pressure (Pcd_lowbound), and setting a speed of the multi-speed condenser fan based on the determined condensing pressure Pcd and at least one of the upper bound condensing pressure Pcd_upbound and the lower bound condensing pressure Pcd_lowbound.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
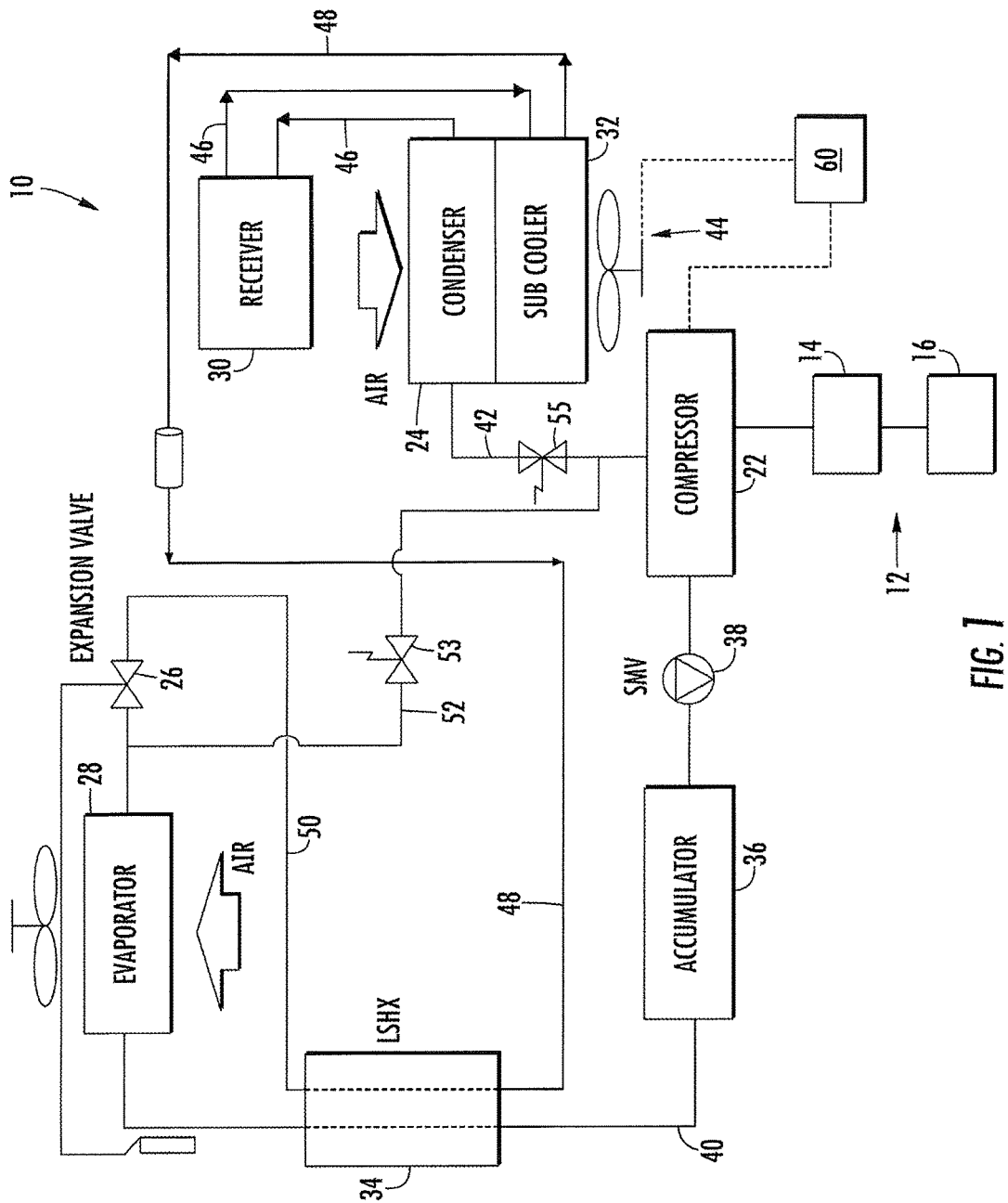
FIG. 1 is a schematic view of an exemplary refrigeration system.

FIG. 1 illustrates a refrigeration system 10. In the exemplary embodiment, refrigeration system 10 is operably associated with a temperature controlled cargo container (not shown) configured to maintain a cargo located inside the cargo container at a selected temperature through the use of refrigeration system 10. The cargo container may be utilized to transport cargo via, for example, a truck, a train or a ship. Transportation refrigeration applications are distinct from other applications due to their wide range of operating conditions. For example, the ambient temperature may vary from 130° F. to −20° F., and the cargo container may be set at a temperature between 100° F. and −22° F. However, system 10 may be utilized in various other refrigeration applications.

Refrigeration system 10 is powered by a power generation system 12, which generally includes an engine 14 that is fluidly coupled to a fuel tank 16. Although described as a refrigeration system, system 10 may be any suitable environment conditioning system. For example, system 10 may be a cab air conditioning unit for a truck.

Refrigeration system 10 generally includes a compressor 22, a condenser 24, an expansion device 26, and an evaporator 28. As illustrated, system 10 may include a receiver 30, a subcooler 32, a liquid suction heat exchanger 34, an accumulator 36, and a suction modulation valve 38.

Refrigeration system 10 is a closed loop system through which refrigerant is circulated in various states such as liquid and vapor. As such, a low temperature, low pressure superheated gas refrigerant is drawn into compressor 22 through a conduit 40 from evaporator 28. The refrigerant is compressed and the resulting high temperature, high pressure superheated gas is discharged from compressor 22 to condenser 24 through a conduit 42.

In condenser 24, gaseous refrigerant is condensed into liquid as it gives up heat. The superheated gas refrigerant enters condenser 24 and is de-superheated, condensed, and sub-cooled through a heat exchanger process with air forced across condenser 24 by a condenser fan 44 to absorb heat. The liquid refrigerant is discharged from condenser 24 and supplied through a conduit 46 via receiver 30 to subcooler 32. The refrigerant is further sub-cooled by air from condenser fan 44 and is supplied through a conduit 48 to liquid suction heat exchanger 34.

In the exemplary embodiment, liquid suction heat exchanger 34 cools liquid refrigerant from condenser 24 against vaporized and/or vaporizing refrigerant from evaporator 28. The cooled liquid refrigerant is subsequently supplied to evaporator 28 through a conduit 50. The cooled liquid refrigerant passes through metering or expansion device 26 (e.g., expansion valve), which converts the relatively higher temperature, high pressure sub-cooled liquid to a low temperature saturated liquid-vapor mixture.

The low temperature saturated liquid-vapor refrigerant mixture then enters evaporator 28 where it boils and changes states to a superheated gas as it absorbs the required heat of vaporization from air in the container (or other heat exchange fluid). The low pressure superheated gas then passes in heat exchange relation with heat exchanger 34, where it is further heated to increase the superheat of the gas and vaporize any residual liquid droplets that may pass evaporator 28. The superheated gas is then drawn into the inlet of compressor 22 and the cycle is repeated.

In the exemplary embodiment, refrigeration system 10 includes a hot gas valve 53, a main heating valve 55, and a bypass conduit 52 extending between conduit 42 downstream of compressor 22 and conduit 50 upstream of evaporator 28. Bypass conduit 52 may be selectively utilized to force high temperature refrigerant from compressor 22 to flow directly to evaporator 28 for defrosting evaporator 28 in a cooling mode or for heating in a heating mode. Moreover, refrigeration system 10 may include an economizer cycle (not shown).

Condenser fan 44 is utilized in the condenser cycle and, in some embodiments, more than one condenser fan 44 may be utilized. Condenser fan(s) 44 may be variable speed condenser fans and/or a multi-speed condenser fans. Variable speed condenser fans 44 may be operably associated with a variable frequency drive (VFD), and multi-speed condenser fans 44 may be operably associated with a multi-speed drive (MSD).

Utilization of the variable/multi-speed fan 44 facilitates adjustment or modulation of the condensing pressure/temperature of system 10 by controlling the fan speed. For example, a lower condenser fan speed results in less power usage by fan 44. However, this causes a higher condensing pressure/temperature, which requires more compressor pressure lift and causes increased compressor power consumption and engine fuel usage. As such, a balance between compressor power and condenser fan power exists, and refrigeration system 10 includes a controller 60 configured to optimize control of condenser fan 44 to minimize total power consumption of fan 44 and compressor 22 and/or maximize fuel efficiency of engine 14. As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

Controller 60 is configured to determine an optimum condensing pressure/temperature set point, which may be defined as adjusting the condenser fan speed to maintain this condensing pressure/temperature set point while refrigeration system 10 is operated with the lowest power consumption. The optimum condensing pressure/temperature may be calculated abstractly by equation (1) shown below. Further, the optimum pressure/temperature set points may be saved in a table, and controller 60 can search the table to obtain the optimum condensing pressure/temperature for given measured variables (e.g., measured ambient temperature, evaporator outlet pressure or saturation temperature or box temperature, whether a vehicle has a run or stop status, and compressor speed). The determined optimum condensing pressure/temperature thus corresponds to a certain speed of the condenser fan.

$$\varphi_{opt} = f(T_{amb}, Ts_{out,evap}) \lambda CF_{comp},  \quad \text{Equation (1)}$$

where $\varphi_{opt}$ is the optimum set point of condensing pressure or temperature, $T_{amb}$ is the ambient temperature, $T_{s\ out,\ evap}$ is the saturation temperature at the evaporator outlet, and $CF_{comp}$ is a correction factor with considering the compressor speed. The compressor speed correction factor may be a function of the compressor speed in revolutions per minute, f(rpm). In an embodiment, the compressor speed correction factor may be a non-linear function of the compressor speed in revolutions per minute.

Accordingly, controller 60 subsequently operates fan 44 at a speed corresponding to the optimum condensing pressure/temperature set point (which is a function of the measured ambient temperature, evaporator outlet pressure/saturation temperature, and compressor speed) that provides the most fuel efficient conditions for system 10 with considering the transportation run effect on the condenser air flow. Fuel efficiency may be defined as the ratio of system 10 capacity with fuel consumption. By use of equation (1) or the pre-saved table, the optimum condensing pressure/temperature (which corresponds to the highest system efficiency) can be obtained. Controller 60 can control the condensing pressure of system 10 to reach or be within a predetermined range of the setpoint by changing the fan speed, such as with a proportional integral derivative (PID) controller for variable speed fan 44 or logic control for multiple speed fan 44.

However, in some cases, the optimum condensing pressure/temperature defined by the function or table may not be the best value to calculate fan speed, because of simulation/calculation error and or failure to consider air flow effect when the vehicle is operating or not operating. Thus, a system power consumption measurement and trial process may be used to find the actual optimum condensing pressure/temperature. As such, the optimization control may be different for each of a variable speed condenser fan 44 and a multi-speed condenser fan 44, as described herein in more detail.

Figure 2:
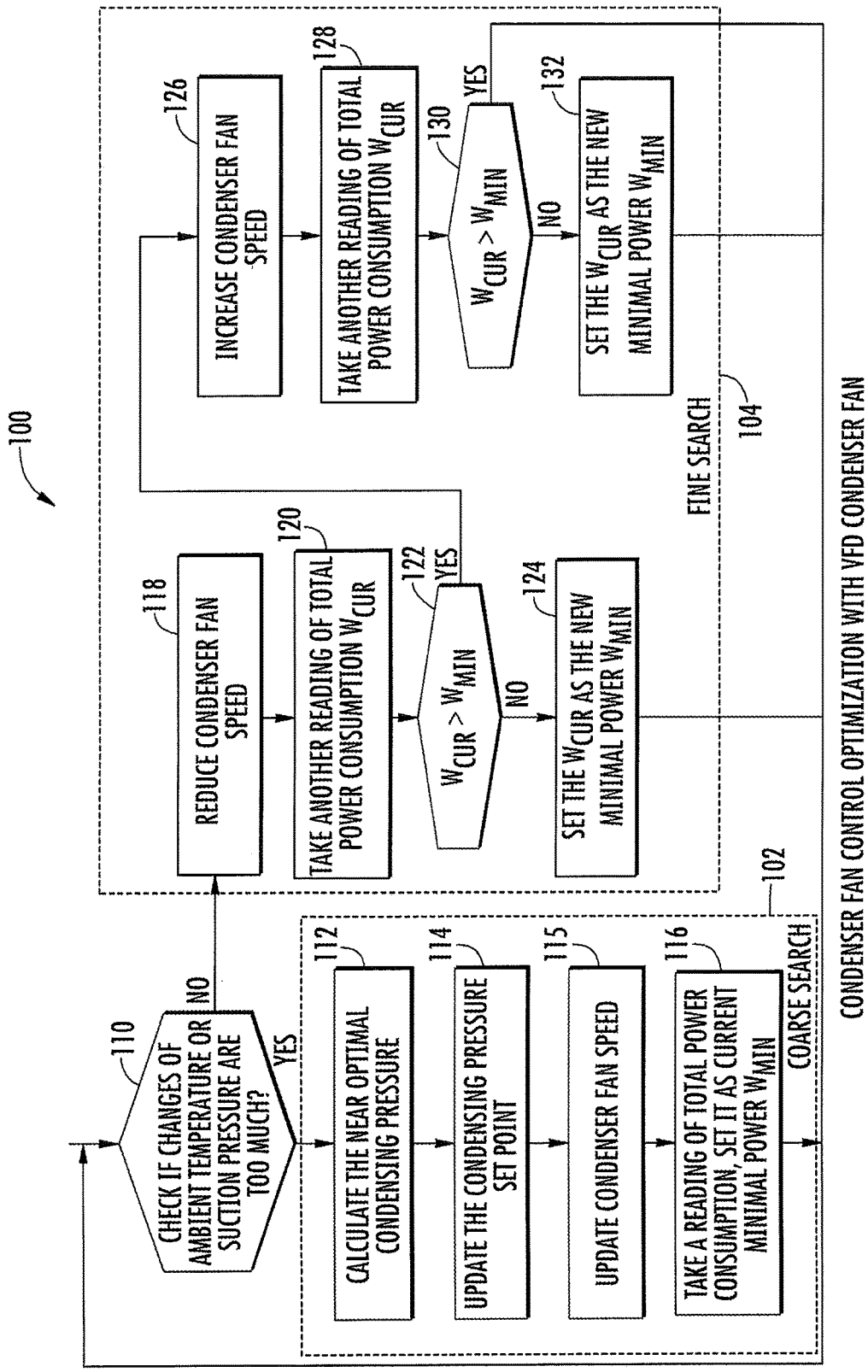
FIG. 2 is a control flow diagram of a first exemplary method of controlling the refrigeration system shown in FIG. 1.

FIG. 2 illustrates an exemplary method 100 for minimizing the power and/or fuel consumption of refrigeration system 10 by specific control of condenser fan 44. In the exemplary embodiment, condenser fan 44 is a variable speed fan.

Method 100 includes a two-level optimization having a coarse search 102 and a fine search 104. Coarse search 102 generally includes determining a near-optimal condensing pressure/temperature setpoint, which is calculated with predefined functions based on off-line simulation results, as described herein. Variable speed fan 44 may then be set at a speed that produces and maintains the near-optimal condensing pressure/temperature setpoint. A condensing pressure/temperature setpoint may be updated according to the determined near-optimal condensing pressure/temperature whenever there are significant changes in environmental and/or operating conditions. To further improve the system efficiency, fine search 104 may be utilized to determine the optimal condensing pressure/temperature through perturbation, as described herein in more detail.

With further reference to FIG. 2, method 100 includes, at step 110, determining if a change in the ambient air temperature and/or compressor suction pressure has exceeded a predetermined threshold. If true, control proceeds to the coarse search 102 and the near optimal condensing pressure/temperature is calculated at step 112 by calculations using, for example, equation (1). At step 114, the condensing pressure/temperature set point is updated (e.g., once per second), and at step 115, controller 60 modulates the fan speed to maintain the set point. At step 116, a reading of total power consumption of refrigeration system 10 is determined (e.g., measured by a current and voltage sensor) and set as current minimal power Wmin. At this point, the control returns to step 110.

If step 110 is false, control proceeds to the fine search 104. At step 118, condenser fan speed is reduced by a predefined step change (e.g., by 1%). At step 120, the total power consumption is again determined and set as current power Wcur.

At step 122, it is determined whether Wcur is greater than Wmin. If false, control proceeds to step 124 where Wcur is set as the new minimal power Wmin, and control subsequently returns to step 110. Steps 110-124 may be repeated until the Wcur is greater than Wmin, and then change the search direction (to step 126).

If step 122 is true, control proceeds to step 126 and the condenser fan speed is increased by a predefined step change (e.g., by 1%). At step 128, the total power consumption is again determined and set as current power Wcur. At step 130, it is determined whether Wcur is greater than Wmin.

If false, control proceeds to step 132 where Wcur is set as the new minimal power Wmin and control subsequently returns to step 126. Steps 126-132 may be repeated until the Wcur is greater than Wmin, where the minimal power is reached. If step 130 is true, control returns to step 110.

As such, the fine search 104 starts from near-optimal setpoints and subsequently decreases/increases the condenser fan speed by a small predefined change. If total power is reduced, then the search is continued in the same direction (i.e., decreased or increased). Otherwise, the search is made in the opposite direction (increases/decreases the setpoint). If total power begins to increase, the set point cannot be improved anymore and is at the optimal condensing pressure/temperature.

Figure 3:
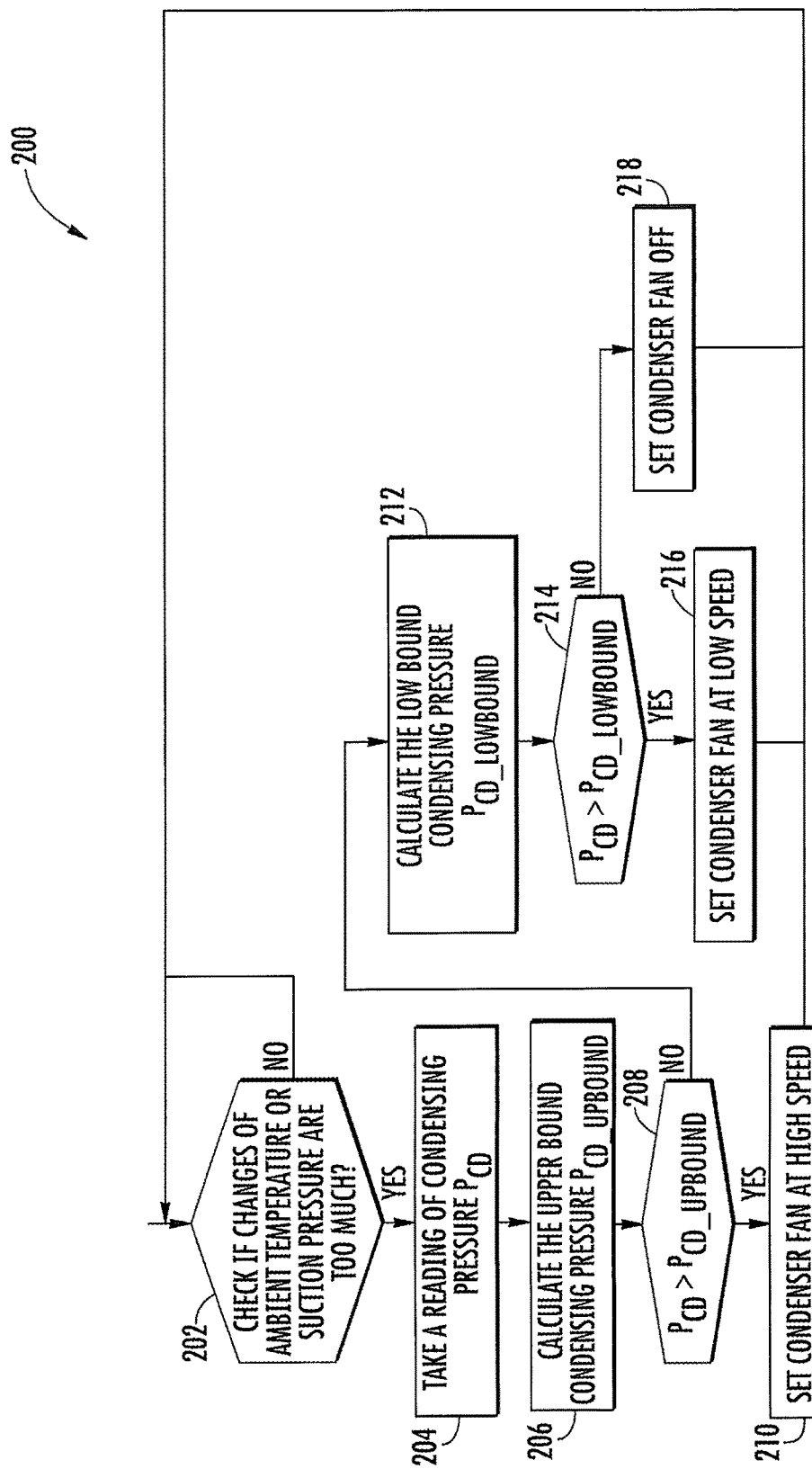
FIG. 3 is a control flow diagram of a second exemplary method of controlling the refrigeration system shown in FIG. 1.

FIG. 3 illustrates an exemplary method 200 for minimizing power and/or fuel consumption of refrigeration system 10 by specific control of condenser fan 44. In the exemplary embodiment, condenser fan 44 is a multi-speed fan having a high-speed mode and a low-speed mode. However, multi-speed condenser fan 44 may have any number of modes that operate at various speeds.

Method 200 includes control optimization to determine how to switch multi-speed fan 44 among the different speed modes at different operating conditions. The condensing pressure/temperature is selected as the gauge variable, and threshold values (upper and lower bounds of condensing pressure/temperature) may be calculated by empirical functions and curve fitted with simulation results.

With further reference to FIG. 3, method 200 includes, at step 202, determining if a change in the ambient air temperature and/or compressor suction pressure has exceeded a predetermined threshold. If false, control returns to step 202. If true, at step 204, condensing pressure Pcd is determined. At step 206, an upper bound condensing pressure Pcd_upbound is determined by an optimum pressure table in different conditions. This optimum pressure table may be defined by simulations. Upper and lower bounds are the pressure limits which determine the condenser fan status. When condensing pressure is above upper bound pressure, the condenser fan runs with high speed. When condensing pressure is below lower bound pressure, the condenser fan is off. When condensing pressure is between lower bound and upper bound pressure, the condenser fan runs with low speed.

At step 208, it is determined whether Pcd is greater than Pcd_upbound. If true, at step 210, multi-speed condenser fan 44 is operated in a first mode (e.g., high speed) and control returns to step 202. If false, at step 212, a lower bound condensing pressure Pcd_lowbound is determined by the optimum pressure table in different conditions.

At step 214, it is determined whether Pcd is greater than Pcd_lowbound. If true, at step 216, multi-speed condenser fan 44 is operated in a second mode (e.g., low speed) and control returns to step 202. If false, at step 218, condenser fan 44 is operated in a third mode (e.g., off) and control returns to step 202.

Described herein are systems and methods for minimizing power and/or fuel consumption of a refrigeration system by control optimization of one or more system condenser fans. The condenser fans may include variable speed and/or a multi-speed condenser fans. Control optimization for the variable speed fan includes determining a near-optimal condensing pressure/temperature based on environmental and system operating conditions and/or determining an optimal condensing pressure/temperature through system perturbation. Control optimization for the multi-speed condenser fan includes selecting a condensing pressure/temperature as a gauge variable, calculating upper and lower bound condensing pressures, and adjusting fan speed modes based on gauge variable relative to the upper and lower bounds.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of controlling a refrigeration system having a compressor, a condenser, an evaporator, and a variable speed condenser fan, the method comprising:
determining if a change in an ambient temperature or a compressor suction pressure is greater than a predetermined threshold;
determining a condensing pressure or temperature if the change in the ambient temperature or the compressor suction pressure is above the predetermined threshold;
setting a condensing pressure setpoint based on the determined condensing pressure or temperature; and
setting a speed of the variable speed condenser fan based on the condensing pressure setpoint;
wherein determining the condensing pressure or temperature comprises:
determining the ambient temperature;
determining a saturation temperature leaving the evaporator;
determining a compressor speed; and
determining the condensing pressure or temperature based on a function of the determined ambient temperature, saturation temperature leaving the evaporator, and compressor speed.

2. The method of claim 1, wherein the condensing pressure or temperature is determined using the equation:

$$\varphi_{opt} = f(T_{amb}, Ts_{out,evap}) \times CF_{comp},$$

where $\varphi_{opt}$ is the set point of condensing pressure or temperature, $T_{amb}$ is the ambient temperature, $Ts_{out,evap}$ is the saturation temperature at the evaporator outlet, and $CF_{comp}$ is a correction factor with considering the compressor speed.

3. The method of claim 1, further comprising:
determining a first total power consumption of the refrigeration system and setting as a current minimal power (Wmin);
reducing a speed of the variable speed condenser fan by a predetermined amount;
subsequently determining a second total power consumption of the refrigeration system and setting as a current power (Wcur); and
determining if Wcur is greater than Wmin.

4. The method of claim 3, further comprising:
increasing the speed of the variable speed condenser fan by a predetermined amount if Wcur is greater than Wmin;
subsequently determining a third total power consumption of the refrigeration system and setting as current power (Wcur); and
determining if Wcur is greater than Wmin.

5. A method of controlling a refrigeration system having a compressor, a condenser, an evaporator, and a multi-speed condenser fan, the method comprising:
determining if a change in the ambient temperature or a suction pressure is greater than a predetermined threshold;
determining a condensing pressure (Pcd) if the change in the ambient temperature or the suction pressure is greater than the predetermined threshold,
determining an upper bound condensing pressure (Pcd_upbound);
determining a lower bound condensing pressure (Pcd_lowbound); and
setting a speed of the multi-speed condenser fan based on the determined condensing pressure Pcd and at least one of the upper bound condensing pressure Pcd_upbound and the lower bound condensing pressure Pcd_lowbound;
wherein determining at least one of the upper bound condensing pressure Pcd_upbound and the lower bound condensing pressure Pcd_lowbound comprises using a pressure table defining pressures at different conditions, wherein the conditions are functions of ambient temperature, evaporator outlet saturation pressure or temperature, and compressor speed.

6. The method of claim 5, wherein determining the condensing pressure Pcd comprises using a pressure table defining pressures at different conditions, wherein the conditions include ambient temperature, evaporator outlet saturation temperature or box temperature, vehicle run or stop status, and compressor speed.

7. The method of claim 5, wherein determining the upper bound condensing pressure Pcd_upbound comprises using a pressure table defining pressures at different conditions, wherein the conditions include ambient temperature, evaporator outlet saturation temperature or box temperature, vehicle run or stop status, and compressor speed.

8. The method of claim 5, wherein determining the lower bound condensing pressure Pcd_lowbound comprises using a pressure table defining pressures at different conditions, wherein the conditions are functions of ambient temperature, evaporator outlet saturation pressure or temperature, and compressor speed.

9. The method of claim 5, further comprising determining whether Pcd is greater than Pcd_upbound.

10. The method of claim 9, further comprising operating the multi-speed condenser fan in a high speed mode if Pcd is greater than Pcd_upbound.

11. The method of claim 5, further comprising determining whether Pcd is greater than Pcd_lowbound.

12. The method of claim 11, further comprising operating the multi-speed condenser fan in a low speed mode if Pcd is greater than Pcd_lowbound.

13. The method of claim 11, further comprising turning off the multi-speed condenser fan if Pcd is less than or equal to Pcd_lowbound.

14. A method of controlling a refrigeration system having a compressor, a condenser, an evaporator, a variable speed condenser fan, and a multi-speed condenser fan, the method comprising:
  determining if a change in an ambient temperature or a compressor suction pressure is greater than a predetermined threshold;
  controlling a speed of the variable speed condenser fan, comprising:
  determining a condensing pressure or temperature if the change in the ambient temperature or the compressor suction pressure is above the predetermined threshold;
  setting a condensing pressure setpoint based on the determined condensing pressure or temperature; and
  setting a speed of the variable speed condenser fan based on the condensing pressure setpoint; and
  controlling a speed of the multi-speed condenser fan, comprising:
  determining a condensing pressure (Pcd) if the change in the ambient temperature or the suction pressure is greater than the predetermined threshold,
  determining an upper bound condensing pressure (Pcd_upbound);
  determining a lower bound condensing pressure (Pcd_lowbound), and
  setting a speed of the multi-speed condenser fan based on the determined condensing pressure Pcd and at least one of the upper bound condensing pressure Pcd_upbound and the lower bound condensing pressure Pcd_lowbound;
  wherein determining at least one of the upper bound condensing pressure Pcd_upbound and the lower bound condensing pressure Pcd_lowbound comprises using a pressure table defining pressures at different conditions, wherein the conditions are functions of ambient temperature, evaporator outlet saturation pressure or temperature, and compressor speed.

* * * * *